(12) United States Patent
Feussahrens et al.

(10) Patent No.: US 7,784,850 B2
(45) Date of Patent: Aug. 31, 2010

(54) CABRIOLET

(75) Inventors: Heino Feussahrens, Wagenfeld (DE); Winfried Bunsmann, Bissendorf (DE)

(73) Assignee: Wilhelm Karmann GmbH, Osnabrueck ( * ) Notice: Subject to any disclaimer, the term of this patent is extended or adjusted under 35 U.S.C. 154(b) by 547 days.

(21) Appl. No.: 11/572,047

(22) PCT Filed: Jul. 7, 2005

(86) PCT No.: PCT/DE2005/001208

§ 371 (c)(1),
(2), (4) Date: Feb. 16, 2007

(87) PCT Pub. No.: WO2006/005320

PCT Pub. Date: Jan. 19, 2006

(65) Prior Publication Data

US 2008/0054672 A1    Mar. 6, 2008

(30) Foreign Application Priority Data

Jul. 13, 2004    (DE) ....................... 10 2004 033 870

(51) Int. Cl.
*B60J 7/19* (2006.01)
(52) U.S. Cl. .................. 296/124; 296/128; 296/121
(58) Field of Classification Search ............ 296/107.11, 296/107.17, 121, 108, 107.01, 107.12, 107.09, 296/117, 124, 128
See application file for complete search history.

(56) References Cited

U.S. PATENT DOCUMENTS

| | | | | |
|---|---|---|---|---|
| 5,558,388 A * | 9/1996 | Furst et al. ............... | 296/107.2 |
| 5,769,483 A * | 6/1998 | Danzl et al. ............ | 296/107.08 |
| 6,578,898 B2 * | 6/2003 | Rothe et al. ............ | 296/107.07 |
| 6,702,362 B2 * | 3/2004 | Eichholz et al. ............. | 296/108 |
| 6,834,907 B2 * | 12/2004 | Dietl ......................... | 296/121 |
| 2001/0006297 A1 * | 7/2001 | Dintner et al. ......... | 296/107.17 |
| 2003/0080580 A1 * | 5/2003 | Obendiek .............. | 296/107.17 |
| 2004/0145210 A1 * | 7/2004 | Fuchs et al. ............ | 296/107.08 |
| 2004/0178656 A1 * | 9/2004 | Hahn .................... | 296/107.08 |
| 2005/0269832 A1 * | 12/2005 | Queveau et al. ............. | 296/108 |
| 2006/0152033 A1 * | 7/2006 | Schartner et al. ....... | 296/107.09 |
| 2006/0290164 A1 * | 12/2006 | Bunsmann ............. | 296/107.01 |

FOREIGN PATENT DOCUMENTS

DE    10248349 A1    5/2004
EP    1449698 A1    8/2004

* cited by examiner

*Primary Examiner*—Patricia L Engle
*Assistant Examiner*—SunSurraye Westbrook
(74) *Attorney, Agent, or Firm*—Quinn Law Group, PLLC

(57) ABSTRACT

A convertible with a roof, which can be displaced longitudinally in an approximately horizontal position towards the rear of the vehicle, between a closed position, in which the roof is held directly or indirectly against the windshield frame and an intermediate position, in which the fixture between the roof and the windshield frame is released, is provided. The roof, for at least part of the lowering motion, is held in a receiving space of the car body in the rear intermediate position and in the lowered condition it can be displaced longitudinally towards the front of the vehicle. At least one displaceable locking element for the roof can be actuated during the longitudinal displacement of the stowed-away roof.

12 Claims, 6 Drawing Sheets

CABRIOLET

CROSS-REFERENCE TO RELATED APPLICATION(S)

This application is a US National Phase of International Application No. PCT/DE 2005/001208, filed Jul. 7, 2005, which claims priority to German 10 2004 033 870.1 filed Jul. 13, 2004. The entire contents of the above identified applications are incorporated herein by reference.

TECHNICAL FIELD

The invention concerns a convertible vehicle with a roof able to move lengthwise between a closed position and an intermediate position.

BACKGROUND OF THE INVENTION

DE 102 48 349 A1 shows such a convertible vehicle, in which for the opening of the roof it is first moved backward far enough so that engaging dowels located on the top of the roof are released from their form-fitting fixture against a windshield frame, then the roof is swiveled into the rearward intermediate position and stowed away in the car body and in this position it can again be displaced lengthwise forwards in the direction of travel. The engaging dowels on the apex of the roof can fit into a receptacle at the car body, in order to secure the roof in the opened position. However, the securing only lasts as long as the drive unit is interlocked and the roof is actively prevented from moving into the rearward position.

The basic problem of the invention is to improve the securing of the stowed-away roof in a convertible vehicle of the above mentioned kind.

SUMMARY OF THE INVENTION

The invention enables a holding of the roof in its stowed-away position via a locking element which is present in addition to the drive unit, so that the securing of the roof in this position does not need to be done solely by the drive unit.

When, advantageously, the locking element(s) can be activated by a forward directed lengthwise displacement of the stowed-away roof in the closing direction and by a rearward directed lengthwise displacement in the opening direction, this eliminates the need for additional expense to control the locking process.

An especially good fixture of the stowed-away roof is achieved when the locking element is connected by a force transmitting element to the drive unit, which in the closed position of the locking element is held in a past dead center position. An unintentional powering of the roof, for example when driving over a pothole, will not then lead to the releasing of the locking element when the drive unit is in idle gear. Thus, the locking in the closed position is totally independent of the drive unit. The locking element can also actively pull parts of the roof downwards during the closing process, enabling an especially flat roof package, so that the remaining trunk space is increased.

Insofar as the longitudinal displacement of the roof is to be achieved at least by acting on main bearings situated at the sides, the roof can have a traditional configuration and be installed as a modular component in the car body. The displacement then involves only the interface between the roof module as a whole and the car body.

In this case, side guide rails can be arranged in the car body in particular to ensure a reliable movement, free of jamming.

If a cam disk is provided as the force transmitting element, which moves both a rod linkage for the closing element and the slide for the longitudinal displacement of the roof, the construction expense for the longitudinal displacement and the locking of the roof is minimized. The above-mentioned advantageous over dead center position can then also be realized easily by an appropriately shaped connecting link in the cam disk.

When the locking element(s) is configured as a hook and especially when a fixture shoulder of the roof is engaged from behind, the stowed-away roof can be secured against both a rearward longitudinal displacement and against an upward displacement.

A displacement path of the roof of only a few centimeters is mechanically noncritical: an adjustment element for this can be simple and compact in design. The time it takes to open or close the roof is only minimally increased thanks to the slight displacement path.

In particular, the invention can also be used on a roof with rigid roof parts.

Further benefits and features of the invention will emerge from a sample embodiment of the object of the invention as represented in the drawing and described hereafter.

Figure 1:
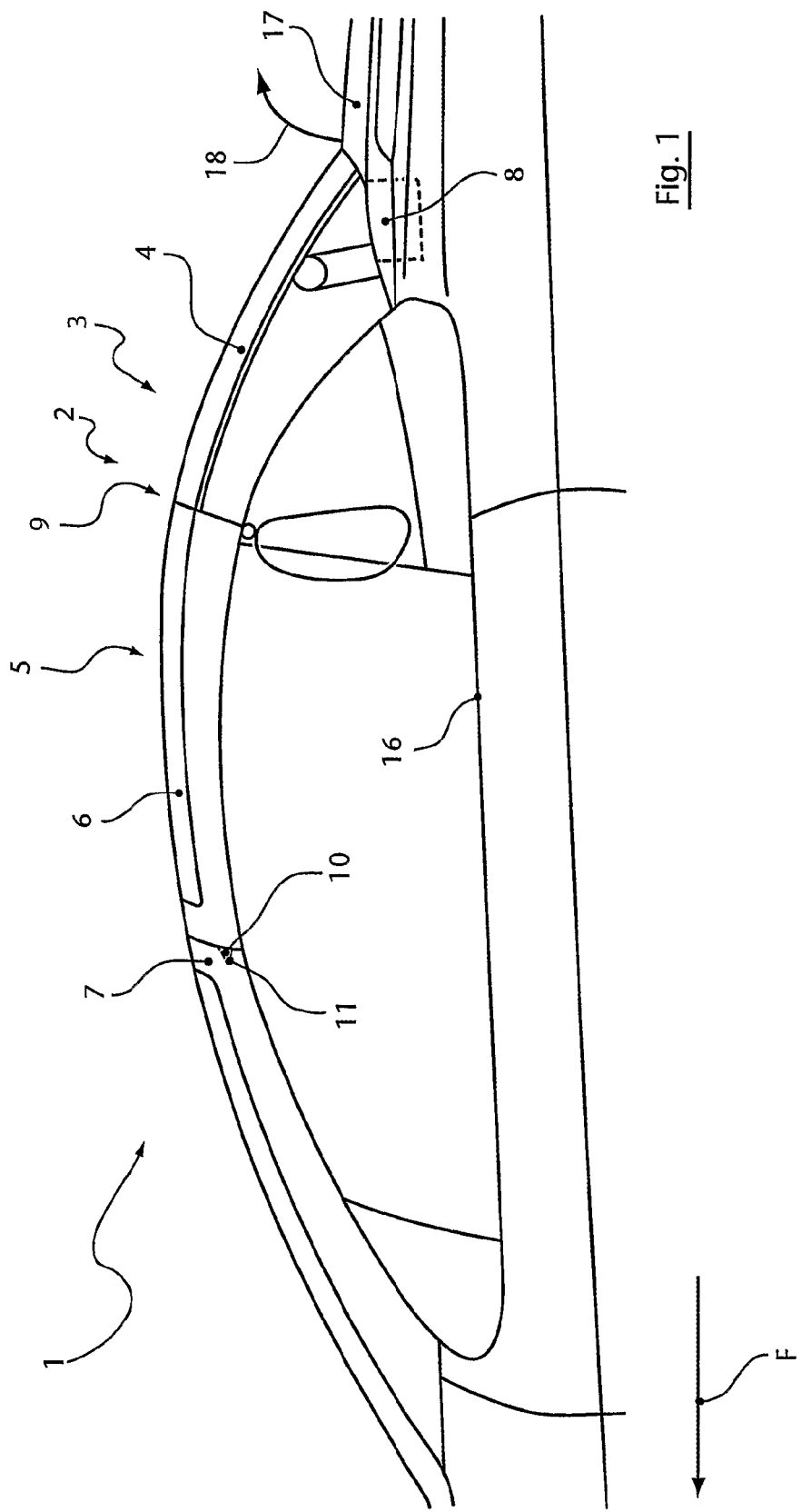
FIG. 1, a convertible according to the invention in schematic side view, broken off at bottom, with the roof closed, FIG. 1*a*, a view similar to FIG. 1 with additionally drawn adjustment element for the displacement of the main bearing and with opened sliding roof of a front roof part, FIG. 2, a view similar to FIG. 1 after horizontal displacement of the roof against the direction of travel to initiate an opening of the roof, FIG. 3, a view similar to FIG. 2 during the opening movement of the roof, FIG. 4, a view similar to FIG. 3 with the roof fully open and main bearing again displaced forward, FIG. 5, a detail view of components critical to the roof longitudinal displacement and locking, roughly corresponding to cut-out V in FIG. 4, FIG. 6, a view similar to FIG. 5, but with the roof displaced longitudinally rearward.

The invention can be used for either a two-seat convertible 1, as shown in FIG. 1, or a convertible with more seats, such as two rows one behind the other.

DESCRIPTION OF THE PREFERRED EMBODIMENTS

The vehicle 1 comprises a movable roof 2, which has a rear roof part 3 with a rear windshield 4 in terms of the direction of travel F. The roof part 3 can be rigid and consist, for example, mainly of steel, a light metal, a metallic foam material, or plastic. It is also possible for the rear roof part 3 to be formed essentially by only a dome-like curved rear windshield 4.

Moreover, the roof 2 has a front roof part 5 which is situated in front of the roof part 3 in the direction of travel in the closed condition. In the sample embodiment with a two seat vehicle 1, this is formed by a continuous sheet part with no further transverse division. In the closed condition, this thrusts directly against the windshield frame 7 or indirectly with the interpositioning of yet another part, such as an adjustable sun screen or some other intermediate part. The roof parts 3, 5 can be made not only as rigid structural parts, but also as units with collective or individual textile covering.

Figure 1A:
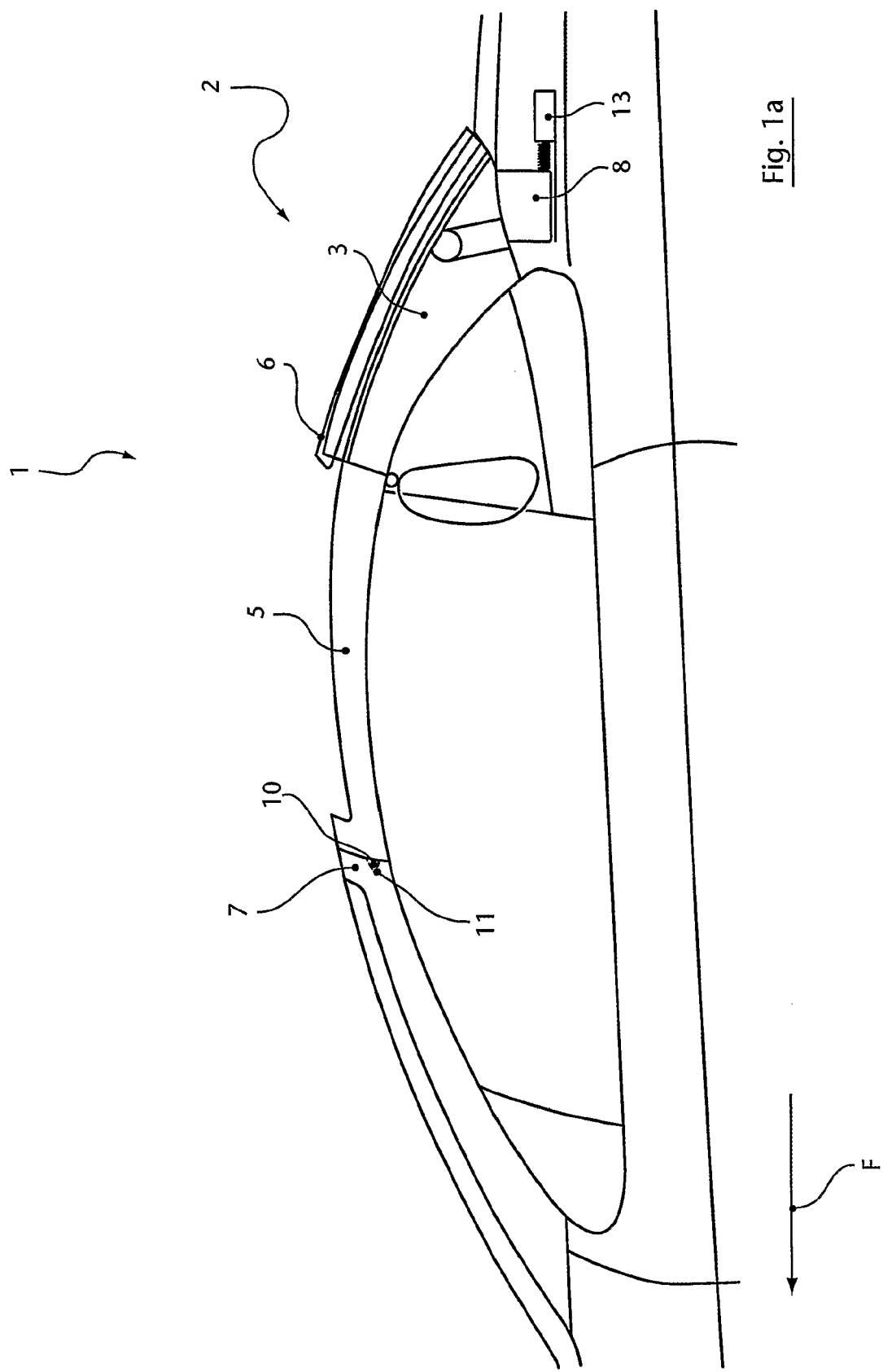

The front roof part 5 in the sample embodiment of FIG. 1a also comprises a slidable sheet body 6, which can be opened in the manner of a sliding roof and moved across the rear roof part 3.

Figure 3:
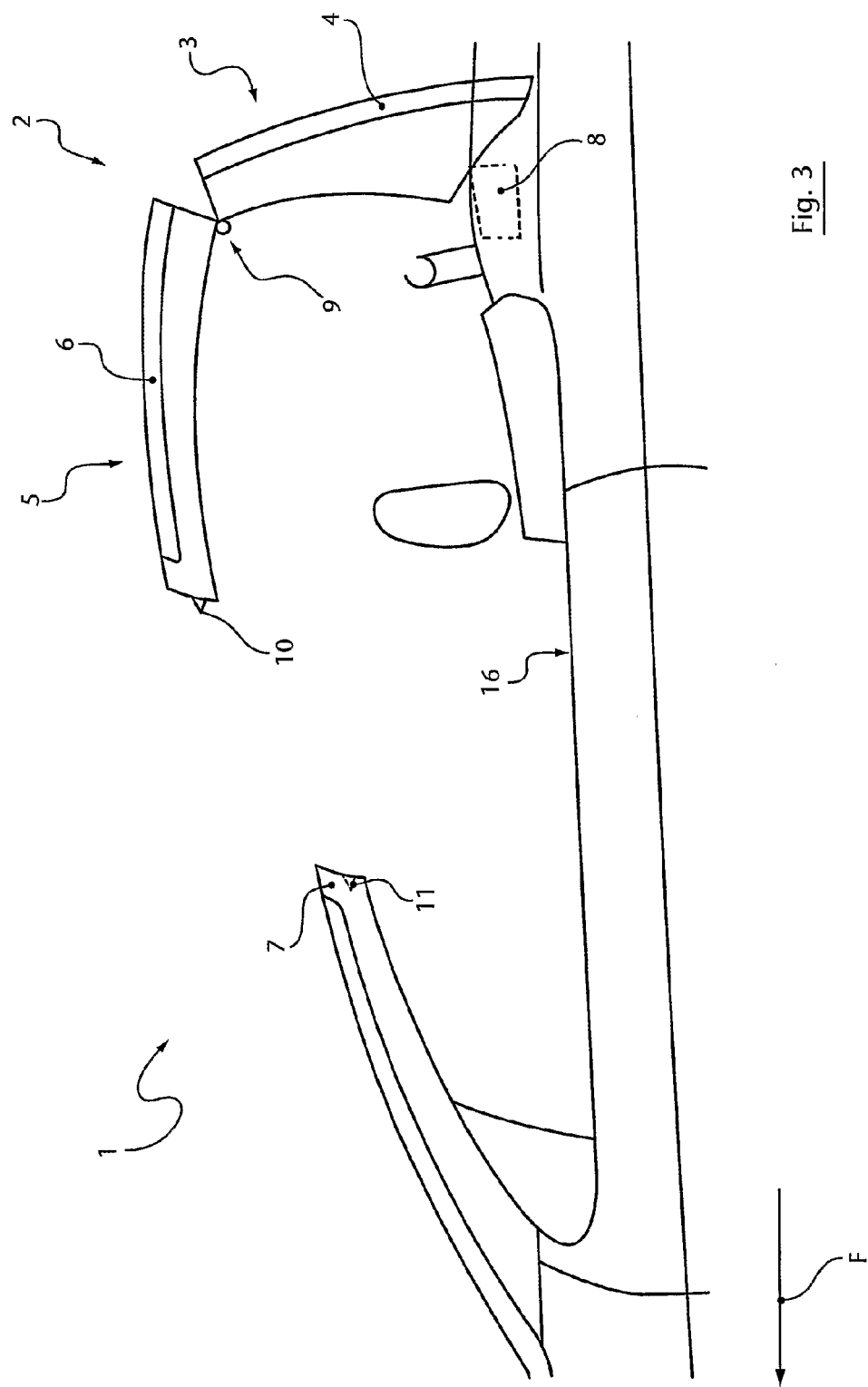

The roof parts 3, 5 for their stowing away into the car body or for their closing motion in the opposite direction can swivel about horizontal axes lying transverse to the vehicle 1 and coordinated with main bearings 8 located at the side in the car body. The two roof parts 3, 5 swivel together about the main bearing 8 and can at the same time fold against each other about their parting plane 9 for the opening (FIG. 3). Instead of the pure swivel bearings 8, other movable holders for the roof 2 on the car body are also possible as the main bearings, such as multiple-link units or devices for superimposed motions with translatory and rotational components.

For fastening the front roof part 5 on the windshield frame 7, dowels 10 are coordinated with the roof part 5, situated roughly in its dimensional plane and pointing in the direction of travel F in the closed condition. These can engage with complementary recesses 11 of the windshield frame 7. The dowels 10, as well as the recesses 11, can be conical, so as to facilitate a centering of the closing roof 2. Other suitable holding means can also be provided in addition or as alternatives.

In the sample embodiment, each of the side main bearings 8 is coordinated with a drive unit 13, such as a hydraulic cylinder, a spindle, an electric motor, or the like. A joint drive unit is also possible in principle. Thanks to the drive unit 13, the respective main bearing 8—and thus the entire roof 2 supported by it—can move longitudinally and horizontally in the direction of the arrow H between an extreme forward position (FIG. 1) and an extreme rear position (FIG. 2), designated here as the intermediate position, in which the roof 2 has moved so far opposite the direction of travel F that the dowels 10 are disengaged from the recesses 11 of the windshield frame 7. In this position, the roof 2 can swivel freely about the bearings 8, without any danger of collision of the roof apex with the windshield frame 7.

For the longitudinal displacement of the main bearings 8, these are mounted via bearing boxes, configured as slides 19, on guide rails 20 lying lengthwise in the car body.

The path H between the extreme forward and rear position of the drive unit 13 is limited by a possibly adjustable rear stop in such a way that, in the extreme rear position of the roof 2, the dowels 10 are far enough disengaged from the windshield frame 7 that the swiveling can occur. On the contrary, too far a rearward displacement would needlessly delay the opening or closing process. The path H between the extreme positions is therefore only a few centimeters, say, between two and eight centimeters. Typically, a displacement path is around 4 centimeters. Thanks to the short displacement path H, the horizontal displacement and the swiveling of the roof 2 can occur entirely in succession.

Instead of the depicted entirely horizontal longitudinal displacement, a displacement of the bearings 8 and the roof 2 supported thereon in a plane slightly tilted to the horizontal is also possible, say, in a plane which can follow an ascending window parapet line or a descending rear line.

In the sample embodiment, moreover, a canopy box cover 17 is coordinated with the rear region of the car body, roughly in the plane of the window parapet line 16, and it can swivel open in the direction of the arrow 18.

Figure 2:
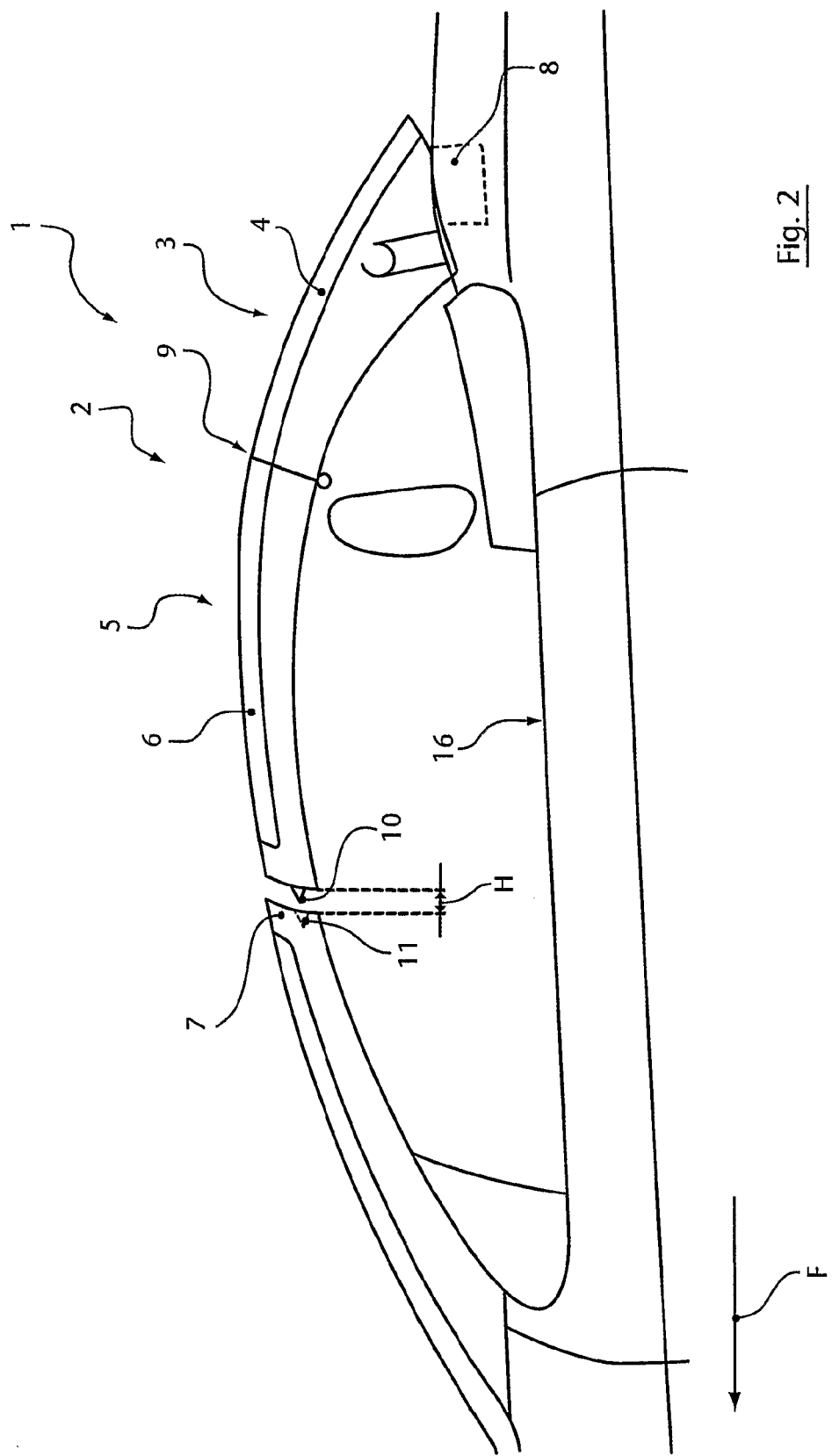

For the opening of the roof 2 from the closed position (FIG. 1) into a fully opened position (FIG. 4), at first the canopy box cover 17 is opened in the direction of the arrow 18. Then, after unlocking the locks (under remote control in the example), the main bearings 8 are moved longitudinally via the drive units 13, opposite to the direction of travel F, into a rear intermediate position, and at the same time the front roof part 5 is released from the windshield frame 7 by pulling the dowels 10 out from the recesses 11 in the direction of the arrow H (FIG. 2).

Next, the roof 2 is swiveled downward about the bearings 8, and at the same time the roof parts 3 and 5 swivel toward each other (FIG. 3).

Figure 4:
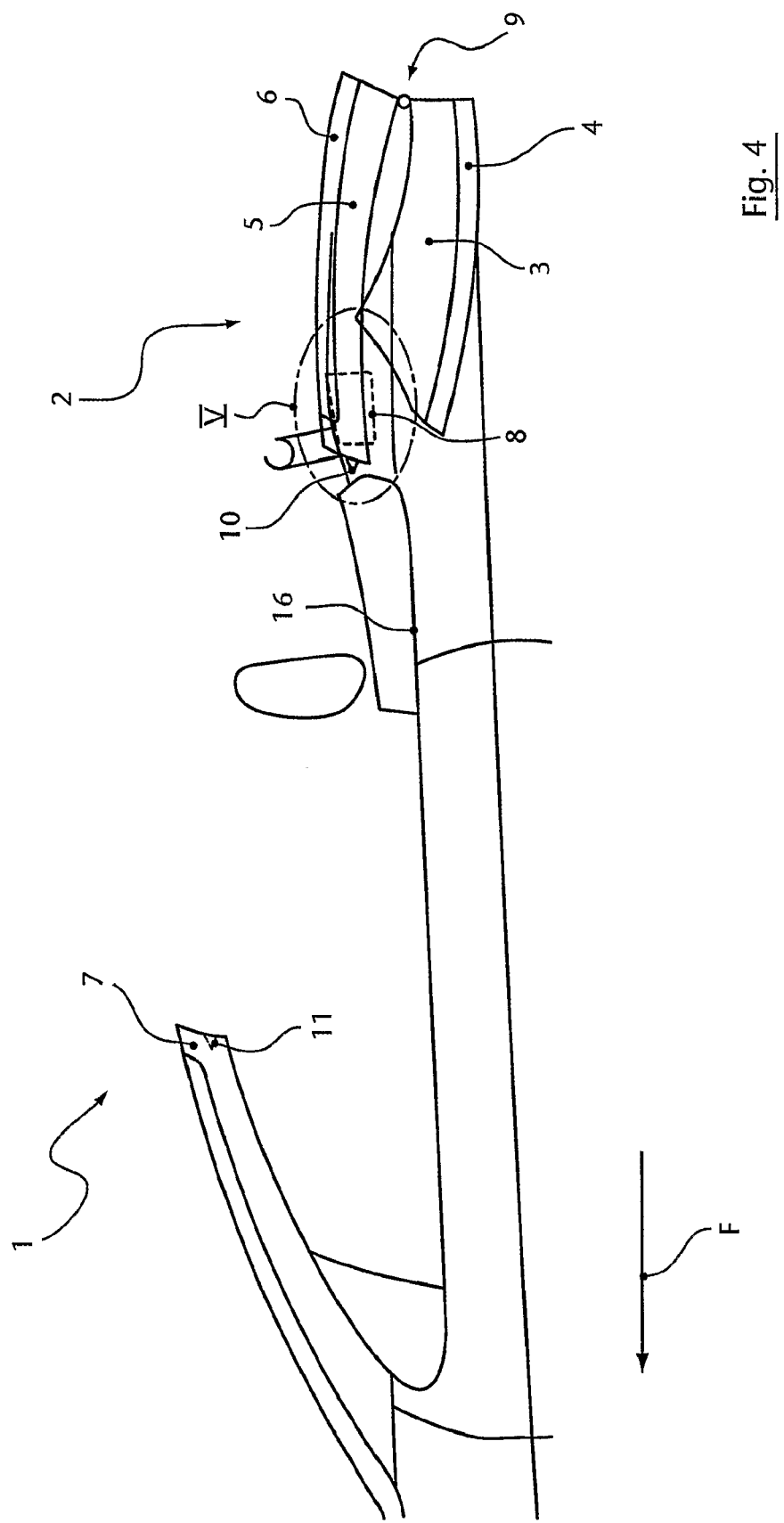
Figure 5:
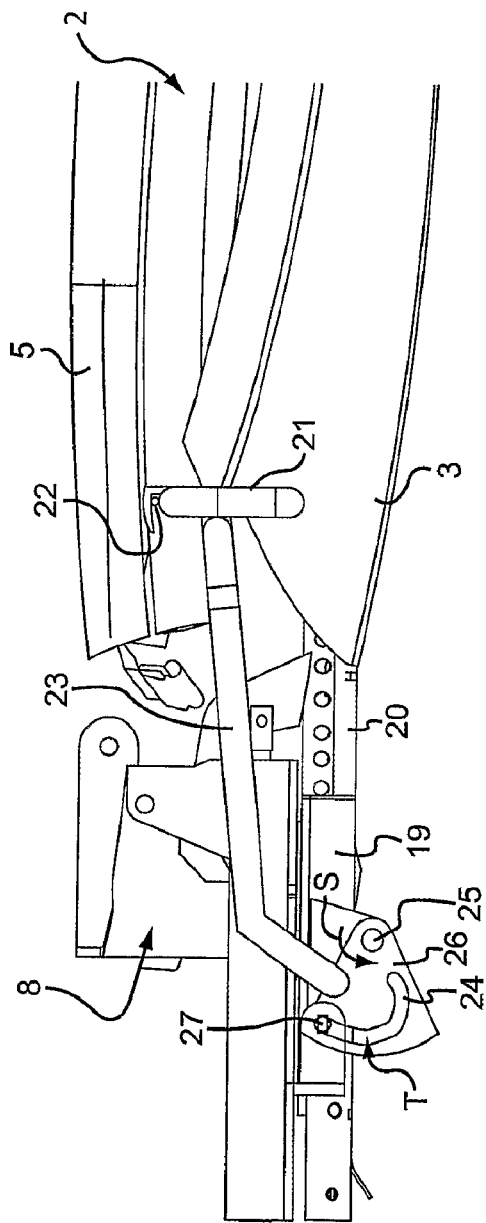
Figure 6:
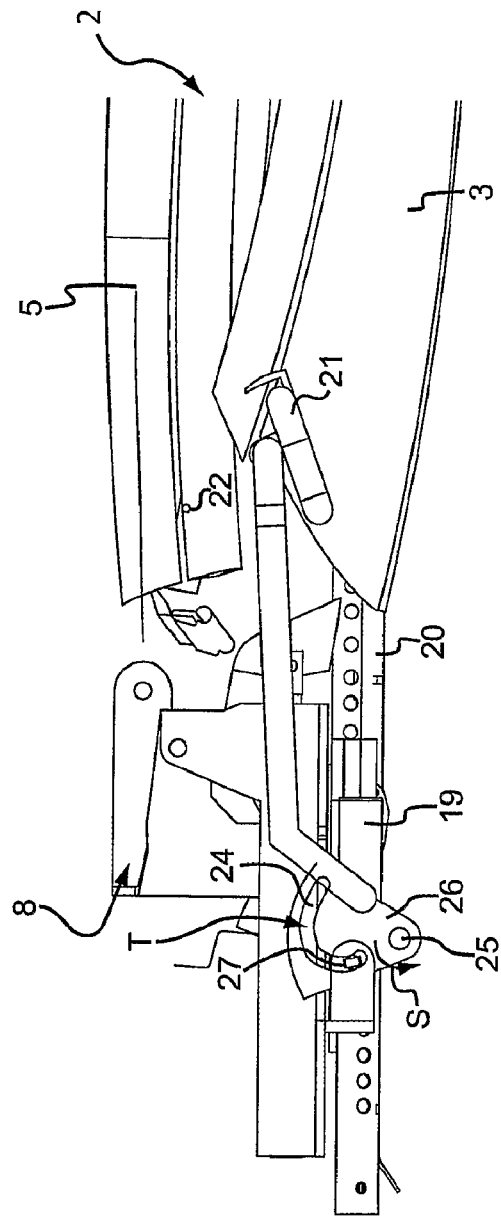

In this way, the roof gets into the stowed position of FIG. 6, not yet moved forward again, from which it can be displaced longitudinally forward into the final opened position (FIG. 4, FIG. 5).

During this longitudinal displacement of the stowed roof 2, which can be produced by the drive unit(s) 13, at the same time at least one locking element 21 can move between its open and its closed position so that it can be actuated by a forward directed longitudinal displacement of the stowed roof 2 in the closing direction and by a rearward directed longitudinal displacement in the opening direction. Thus, the locking element 21 is closed at the same time and (here) by constrained motion with the longitudinal displacement of the stowed roof 2 in the direction of travel F, so that the roof 2 is secured in its final stowed-away position (FIG. 5).

The locking element 21 is formed here by a swivel hook, which in its closed position engages from behind a fixture shoulder 22 projecting transversely out to the side, such as a stub axle, of the roof 2, thereby preventing an unwanted movement of the roof 2 either rearward or upward.

The locking hook 21 is joined by a rod linkage 23 to a cam disk 26, which serves as the force transmitting element between the drive unit 13 and the rod linkage 23. The cam disk 26 can be supported directly on a drive shaft 25 arranged transversely to the vehicle 1 and mounted permanently on the car body and have the dual function of also moving a shoulder 27 of the slide 19, guided in its cam crank 24.

Alternatively, the drive unit 13 can also move the slide 19 directly, in which case the shoulder 27 guided in the crank 24 swivels the cam disk 26 about the axis of the drive shaft 25.

In either case, the removed crank 24 of the cam disk 26 is shaped such that, as the slide 19 is displaced in the direction of travel F (transition from FIG. 6 to FIG. 5), the cam disk 26 is forced to swivel in the direction of the arrow S and the slide 19 via its shoulder 27 is moved up to the center point T in the crank 24 in the direction of travel F and, as the cam disk 26 continues to swivel, beyond the center point T and very slightly rearwards. During the entire swiveling S, the rod linkage 23 pulls the locking hook 21 into its closing direction. As a result, it is held in the final securing position (FIG. 5) in a past dead center position of the cam disk 26.

In this final position per FIGS. 4 and 5, the canopy box cover 17 can close again over the stowed away roof 2, and a very flat roof package is made possible thanks to the downward pulling by the locking hook 21.

The invention can be applied in both vehicles with manually moving roofs and with full or partial automatic mobility of the roof 2. It is also possible to provide drive units 13 only for the horizontal displacement H and to perform the actual folding and unfolding of the roof 2 manually.

While the best modes for carrying out the invention have been described in detail, those familiar with the art to which this invention relates will recognize various alternative designs and embodiments for practicing the invention within the scope of the appended claims.

The invention claimed is:
1. A convertible vehicle comprising:
a windshield frame (7);

a roof (2) moveable between a closed position in which the roof (2) is held directly or indirectly against the windshield frame (7), an intermediate position in which the roof (2) is released from the windshield frame (7), and a rear stowed position in which the roof (2) is moveable longitudinally toward a front of the vehicle to a forward stowed position; and at least one displaceable locking element (21) configured for securing the roof (2) in place in the forward stowed position and actuated by displacement of the roof longitudinally forward from the rear stowed position into the forward stowed position.

2. A convertible vehicle per claim 1, characterized in that the locking element (21) is connected by a force transmitting element (26) to a drive unit (13) and the force transmitting element (26) in the closed position of the locking element (21) is held in a past dead center position.

3. A convertible vehicle per claim 1, characterized in that at least one drive unit (13) acts on at least one side main bearing (8) for the longitudinal displacement of the roof (2).

4. A convertible vehicle per claim 3, characterized in that at least one side guide rail (20) is arranged in the car body for the longitudinal displacement, on which a bearing box (19) carrying the particular main bearing (8) can move.

5. A convertible vehicle per claim 4, characterized in that the bearing box (19) is formed by a slide able to move via a shaft (25) and a force transmitting element (26).

6. A convertible vehicle per claim 1, characterized in that a drive unit (13) provided for the longitudinal displacement is coupled in dual function to a rod linkage (19) and a locking element (21).

7. A convertible vehicle per claim 6, characterized in that a cam disk is provided as the force transmitting element (26), which is connected to both the rod linkage (23) for the locking element (21) and the slide (19) for the longitudinal displacement of the roof (2).

8. A convertible vehicle per claim 1, characterized in that the locking element (21) is configured as a locking hook, which in the closed position engages with a fixture shoulder (22) of the roof (2) from behind.

9. A convertible vehicle per claim 1, characterized in that the path (H) of the longitudinal displacement is between two and eight centimeters.

10. A convertible vehicle per claim 1, characterized in that, for the opening of the roof (2), the displacement path (H) of the at least approximately horizontal displacement against a travel direction (F) is limited as far as a roof position in which the front roof part (5) can freely swivel upward without risk of colliding with the windshield frame (7).

11. A convertible vehicle per claim 1, characterized in that the longitudinal displacement (H) and the stowing motion of the roof (2) to the lowered condition, in which at least one swivel component is contained, occur in succession.

12. A convertible vehicle per claim 1, characterized in that the locking element (21) can be activated by a forward directed lengthwise displacement of the stowed-away roof (2) in the closing direction and by a rearward directed lengthwise displacement in the opening direction.

* * * * *